Oct. 15, 1940. W. C. PRITCHARD ET AL 2,217,814
PROCESS FOR MANUFACTURING STORAGE BATTERY PASTE
Filed Aug. 8, 1938
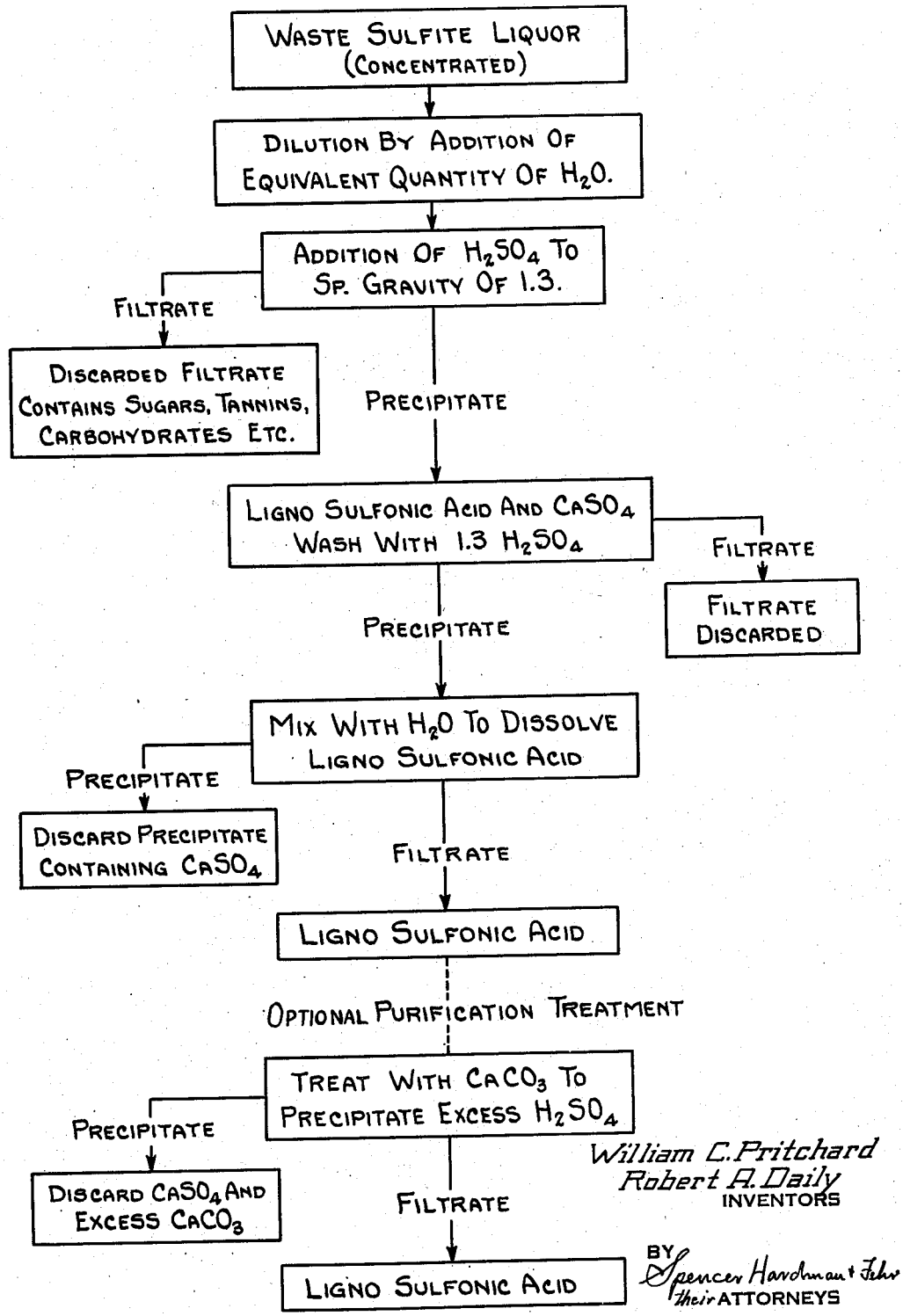

Patented Oct. 15, 1940

2,217,814

UNITED STATES PATENT OFFICE 2,217,814

PROCESS FOR MANUFACTURING STORAGE BATTERY PASTE

William C. Pritchard and Robert A. Daily, Muncie, Ind., assignors to General Motors Corporation, Detroit, Mich., a corporation of Delaware Application August 8, 1938, Serial No. 223,706

3 Claims. (Cl. 136—27)

This invention relates to addition agents to be used in the manufacture of storage battery paste and is particularly concerned with a method of extracting such materials from waste sulphite liquors.

An object of the invention is to provide a method whereby certain desirable constituents, such as ligno-sulphonic acid, in waste sulphite liquor may be readily extracted therefrom for subsequent use as an addition agent in the negative paste of storage battery plates, for giving the plates increased life and capacity, particularly at low ambient temperatures.

It is a further object of the invention to provide a method whereby the ligno-sulphonic acid may be inexpensively extracted in the substantially pure state from waste sulphite liquor.

Further objects and advantages of the present invention will be apparent from the following description, wherein a preferred embodiment of the present invention is clearly shown.

Heretofore various substances have been proposed as addition agents in storage battery paste, in an effort to obtain an improved paste and thereby overcome undesirable properties inherent to the paste. Some of these substances are lignin, wood flour, pulverized leather, humic substances and many other organic and inorganic compounds. Waste sulphite liquor has also been proposed as an addition agent, such liquor being the concentrated by-product of paper manufacture. The waste liquor is obtained from digestion of coniferous woods in a solution of calcium bisulphite and sulphurous acid. The composition of waste sulphite liquor is extremely complex in nature deriving its constituents from practically all ingredients that are originally present in wood, with the exception of cellulose which is separated by filtration after the digestion of the wood in aforementioned solution. During this digestion step the sulphurous acid chemically acts upon the insoluble lignins, sugars, tannins, resins and carbohydrates to cause the same to go into solution. The combination of the calcium bi-sulphite and sulphurous acid also produces some organic calcium compounds.

In application Serial No. 173,863, assigned to the assignees of the present application, the use of ligno-sulphonic acid is disclosed together with one method of separating said acid in a substantially pure state from waste sulphite liquor. Our invention as contained herein is particularly directed to another method whereby ligno-sulphonic acid in the substantially pure state can be readily and inexpensively extracted from the complex waste liquor. We have found that ligno-sulphonic acid is the only desirable constituent in waste sulphite liquor for use as an addition agent in storage battery paste. We have further found that the remaining compounds in the waste sulphite liquor and particularly the calcium compounds are not only unnecessary in this addition agent, but are undesirable, since they decrease the porosity of the paste and of the final active material. Stated differently, the active material formed by using waste sulphite liquor as the addition agent thereto is more dense and therefore more costly, since a greater quantity of oxide of lead is necessary in the manufacture of the plates. Ligno-sulphonic acid in the substantially pure state prepared according to the hereindescribed method is an ideal addition agent for battery paste since the addition of the ligno-sulphonic acid does not decrease the porosity of the active material of the plate and hence does not increase the plate weight.

The single figure of the drawing is a chart diagrammatically illustrating the process.

The waste sulphite liquor of commerce is available on the market in a sirupy form containing about 50% water and about 50% solid. This condition is brought about by neutralization of the liquor, as it comes from the digestors, with either lime or magnesia to remove the excess sulphurous acid, filtering out this insoluble precipitate and evaporating the filtrate to the desired consistency. In accordance with our invention, waste sulphite liquor of commerce is diluted with an equivalent quantity of water to produce a resultant solution containing about 25% total solids. Sulphuric acid having a specific gravity of about 1.400 is then added to the solution in sufficient quantity to bring the specific gravity of the mixture to about 1.300. Sulphuric acid reacts with calcium salts in waste sulphite liquor to form a precipitate of calcium sulphate and set the ligno-sulphonic acid free in the precipitated form, as well as precipitate any free ligno-sulphonic acid that is in solution. Ligno-sulphonic acid is insoluble in sulphuric acid solutions having a specific gravity approximating the gravity of the solution present. The compounds containing the sugars, tannins, carbohydrates, etc., remain in the solution in the dissolved state. The next step in the process is to filter out the precipitate containing the ligno-sulphonic acid and the calcium sulphate and wash the same with a sulphuric acid solution of approximately 1.300 specific gravity, which has no tendency to dissolve the ligno-sulphonic acid, the filtrate in both instances being discarded.

The washed precipitate is next mixed with water, which dissolves out the ligno-sulphonic acid and leaves calcium sulphate as an insoluble residue. This solution is then filtered and the residue of calcium sulphate is then discarded. The filtrate which consists of ligno-sulphonic acid, water and a small amount of entrapped sulphuric acid may then be treated with an excess of calcium carbonate which reacts with the sulphuric acid to precipitate out as calcium sulphate. This solution is then filtered to remove the excess carbonate and the precipitated calcium sulphate. This solution is preferably concentrated before adding it to the paste although it may be used in diluted condition.

The step of purifying the filtrate by removing the free sulphuric acid by the addition of calcium carbonate may be omitted if desired, since sulphuric is used in the preparation of the paste mixture and the amount introduced in conjunction with the ligno-sulphonic acid is negligible.

The quantity of ligno-sulphonic acid solution to be used in the paste mixture varies in accordance of the concentration of the ligno-sulphonic acid therein. We have found that optimum conditions are obtained when using ligno-sulphonic acid in percentages from .05% to 1.0% based on the weight of the paste. It is our belief that this small percentage of ligno-sulphonic acid acts in effect as an addition agent rather than as an expander in the common use of the word. It prevents crystal growth of the lead particles of the negative plate at the beginning of formation and throughout the life of the plate. As far as we can determine there is no swelling or expanding of the ligno-sulphonic acid itself.

While the embodiment of the present invention as herein disclosed, constitutes a preferred form, it is to be understood that other forms might be adopted, all coming within the scope of the claims which follow.

What is claimed is as follows:

1. A process for manufacturing storage battery paste comprising, treating waste sulphite liquor with a mineral acid to form a precipitate containing ligno-sulphonic acid, dissolving out the ligno-sulphonic acid from the precipitate by the action of water, and thereby separating substantially pure ligno-sulphonic acid from the insoluble matter, and then mixing such ligno-sulphonic acid with lead oxide to form a battery paste.

2. A process for manufacturing storage battery paste comprising, treating waste sulphite liquor with sulphuric acid to form a precipitate containing ligno-sulphonic acid, dissolving out the ligno-sulphonic acid from the precipitate by the action of water, and thereby separating substantially pure ligno-sulphonic acid from the insoluble matter, and then mixing such ligno-sulphonic acid with lead oxide to form a battery paste.

3. The process described in claim 1 characterized by the added step of treating the substantially pure ligno-sulphonic acid with calcium carbonate for precipitating out excessive sulphuric acid prior to the step of mixing the substantially pure ligno-sulphonic acid with lead oxide.

WILLIAM C. PRITCHARD.
ROBERT A. DAILY.